(12) United States Patent
Buckland et al.

(10) Patent No.: US 6,618,374 B1
(45) Date of Patent: Sep. 9, 2003

(54) METHOD FOR INVERSE MULTIPLEXING OF ATM USING SAMPLE PREPENDS

(75) Inventors: Kenneth M. Buckland, Rohnert Park, CA (US); Barry W. Field, Santa Rosa, CA (US); Earl B. Manchester, Rohnert Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/365,601

(22) Filed: Jul. 30, 1999

Related U.S. Application Data

(63) Continuation-in-part of application No. 09/151,139, filed on Sep. 10, 1998.

(51) Int. Cl.[7] .............................................. H04L 12/56
(52) U.S. Cl. .................... 370/394; 370/395.1; 370/471; 370/536
(58) Field of Search ............................ 370/395.1, 394, 370/412, 429, 465, 468, 470, 471, 472, 473, 476, 477, 535, 536, 393, 474

(56) References Cited

U.S. PATENT DOCUMENTS

| | | | |
|---|---|---|---|
| 5,065,396 A | * 11/1991 | Castellano et al. | 370/535 |
| 5,231,649 A | * 7/1993 | Duncanson | 370/535 |
| 5,293,378 A | * 3/1994 | Shimizu | 370/535 |
| 5,459,720 A | * 10/1995 | Iliev et al. | 370/394 |
| 5,539,740 A | * 7/1996 | Bruckner | 370/394 |
| 5,608,733 A | * 3/1997 | Vallee et al. | 370/394 |
| 5,706,285 A | * 1/1998 | Saijonmaa et al. | 370/395.1 |
| 5,875,192 A | * 2/1999 | Cam et al. | 370/535 |
| 6,002,670 A | * 12/1999 | Rahman et al. | 370/536 |
| 6,134,246 A | * 10/2000 | Cai et al. | 370/474 |

OTHER PUBLICATIONS

Digital Link, IMUX Fundamentals, Digital Link Corporation, pp. 1–60, 1996.*
"Circuit Emulation Service Interoperability Specification Version 2.0," af–vtoa–0078.000, *The ATM Forum Technical Committee*, Jan. 1997, 93 pages.
"Synchronous Optical Network (SONET) Transport Systems: Commom Generic Criteria," A Module of TSGR, FR–440, Generic Requirements GR–253–CORE, Issue 2, Dec., 1995, *Bellcore*.
"Inverse Multiplexing for ATM (IMA) Specification Version 1.0," AF–PHY–0086.000, *The ATM Forum Technical Committee*, Jul., 1997, 135 pages.
"Integrated Services Digital Network (ISDN) Overall Network Aspects and Functions Functional Architecture of Transport Networks Based on ATM," ITU–T Recommendation 1.326, *International Telecommunication Union*, Nov., 1995, 23 pages.
"Voice and Telephony Over ATM to the Desktop Specification," af–vtoa–0083.000, *The ATM Forum Technical Committee*, May, 1997, 43 pages.

* cited by examiner

*Primary Examiner*—Seema S. Rao
*Assistant Examiner*—Frank Duong
(74) *Attorney, Agent, or Firm*—Baker Botts L.L.P.

(57) ABSTRACT

A single ATM traffic stream is carried over a plurality of lower bandwidth media, such as T-1 or E-1 interfaces, using inverse multiplexing assisted by a prepended byte at the beginning of each ATM cell, the byte containing a key to permit recovery of the proper order of ATM cells.

18 Claims, 1 Drawing Sheet

METHOD FOR INVERSE MULTIPLEXING OF ATM USING SAMPLE PREPENDS

CROSS REFERENCE TO RELATED APPLICATION

This application is a continuation-in-part of U.S. patent application Ser. No. 09/151,139 filed Sep. 10, 1998, and entitled "Method for Inverse Multiplexing of ATM Using Sample Prepends."

TECHNICAL FIELD OF THE INVENTION

This invention relates to digital communications, and in particular to channelized digital data communications over digital loop carrier wired networks. The invention has particular application in distributed digital switching systems for high-speed digital communications.

BACKGROUND OF THE INVENTION

Asynchronous Transfer Mode (ATM) based communication is a high-speed packet-based switched communication technique wherein "cells" (packets) are communicated between a source node and a target node through one or more switches. ATM benefits from high-bandwidth transport media. T1 time division multiplexed (TDM) transmission formats are widely deployed in North America and correspondingly E1 is used in Europe for the transport of multiplexed voice channels and other digital communication. A T1 signal consists of 24 DS-0 channels transported with an eight-bit sample every frame period, with the frame repeating each 125 μs to yield an overall bit rate per DS-0 channel of 64,000 b/s. Higher bandwidth formats are known and used but are much more expensive and less available. DS-3 channels have a reported rate capacity of about 45 Mb/s.

It is desirable to have a single ATM stream with a bandwidth in excess of the T1 transmission format (1.544 Mb/s) but less than is available over the much more expensive DS-3 channel transmission format (45 Mb/s).

ATM cells can be communicated over T1 transport media by dividing up the ATM stream and using inverse multiplexing techniques. In order to do so it is necessary to reconstruct the cell order. The ATM Forum has adopted an IMA standard for inverse multiplexing of ATM which relies on a stream of control signalling cells and more specifically the existing T1 UNI standard to support IMA. An intricate payload block mapping technique is used to reconstruct cell order. This results in considerable cell overhead and is difficult and expensive to implement.

Those of ordinary skill in the art should be aware of the background information found in the following typical publications:

"Synchronous Optical Network (SONET) Transport Domains: Common Generic Criteria," Bellcore GR-253-CORE, Issue 2, December 1995.

"Functional Architecture of Transport Networks Based on ATM," ITU-T Recommendation I. 326, draft revision June, 1997.

"Voice and Telephony over ATM to the Desktop Specification," ATM Forum, AF-VTOA-0083.000, May 1997.

"Inverse Multiplexing for ATM (IMA) Specification," ATM Forum, AF-PHY-0086.000, April 1997.

What is needed is a mechanism to optimize usage of available resources, such as T1 resources, and to support ATM data streams with greater flexibility.

SUMMARY OF THE INVENTION

According to the invention, in a digital multi-path communication system employing asynchronous communication, a single byte prepended to each cell or unit of telecommunication information is used as a key for reconstructing information as required for maintaining data order and integrity. Specifically, a single ATM traffic stream is carried over a plurality of lower bandwidth media and interfaces between an original source and an ultimate destination, such as via multiple T-1 or E-1 interfaces, using inverse multiplexing assisted by a prepended byte at the beginning of each ATM cell, the prepended byte being simply a count used as the key for recovering proper order of the ATM cells.

The invention will be better understood by reference to the following detailed description in connection with the accompanying drawings.

BRIEF DESCRIPTION OF THE DRAWINGS

For a more complete understanding of the present invention, and for further features and advantages, reference is now made to the following description taken in conjunction with the accompanying drawings, where like reference numerals represent like parts, in which.

DETAILED DESCRIPTION OF THE INVENTION

Figure 1:
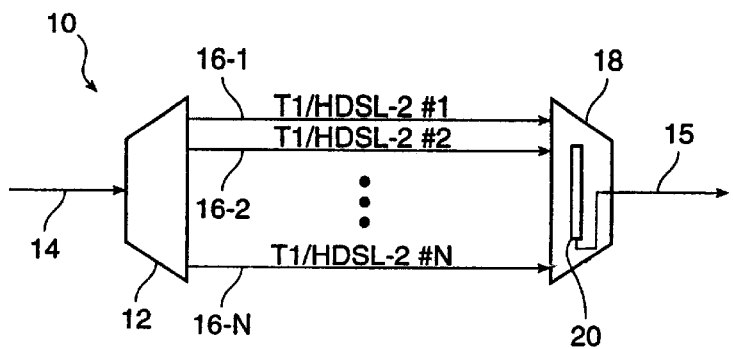
FIG. 1 is a block diagram of a single direction of an IMA transport mechanism according to the invention.

Referring to FIG. 1, there is shown block diagram of a single direction of an IMA transport mechanism 10 according to the invention. An ATM/T1 cluster interface 12 is provided for receiving an ATM data stream on a broadband ATM transport line 14 or from an ATM switch. The T1 cluster includes mechanisms for receiving and inverse multiplexing ATM cells among a plurality of lower bandwidth links, such as T1 and/or HDSL-2 links 16-1, 16-2, 16-N, which in turn are connected to a complementary T1/ATM cluster interface 18. The T1/ATM cluster interface 18 is an inverse multiplexer which reorders the cells of a single cluster in a data stream received over the links 16 into the original cell order and applies the restored data stream to an output broadband transport line 15 or sends it to an ATM switch. According to the invention, the reordering is effected using a prepend byte attached to each cell and thus communicated as part of the inband data stream, the prepend byte containing a simple cell count to identify the order of the cell in the cell stream. Still further according to the invention, T1 links and HDSL-2 links can be randomly mixed to communicate data. The cluster interface 18 includes a mechanism for capturing and buffering ATM cells and examining at least minimal control information associated with each ATM cell. Many different implementations are suitable, the details of which are within the capability of those of ordinary skill.

The ordering operation according to the invention, which is performed by mechanisms within the cluster interface 18, is based on handling of a received count value. How the count value is detected is outside the scope of this disclosure. The count value as processed in the cluster interface 18 is a count ranging from 0 to a value $C_{range}$, where $C_{range}$ is pre-programmable for each ATM stream. That value indicates the maximum cell count allowable, which if exceeded restarts at zero. While the count value is typically less than one byte in length, multiple bytes may also be used to hold the value.

At the cluster interface 18, a queue 20 is provided for collecting received cells. When the cells are received, the count value of each cell, herein C, determines where it should be written in the queue 20 associated with the cell group or IMA stream. As used herein C, H, T, and M are both labels and values associated with the labels at positions in a queue 20. The queue 20 is typically contained in a circular buffer with storage bins sufficiently large to contain a cell, the buffer being of size $C_{range}+1$.

Figure 2:
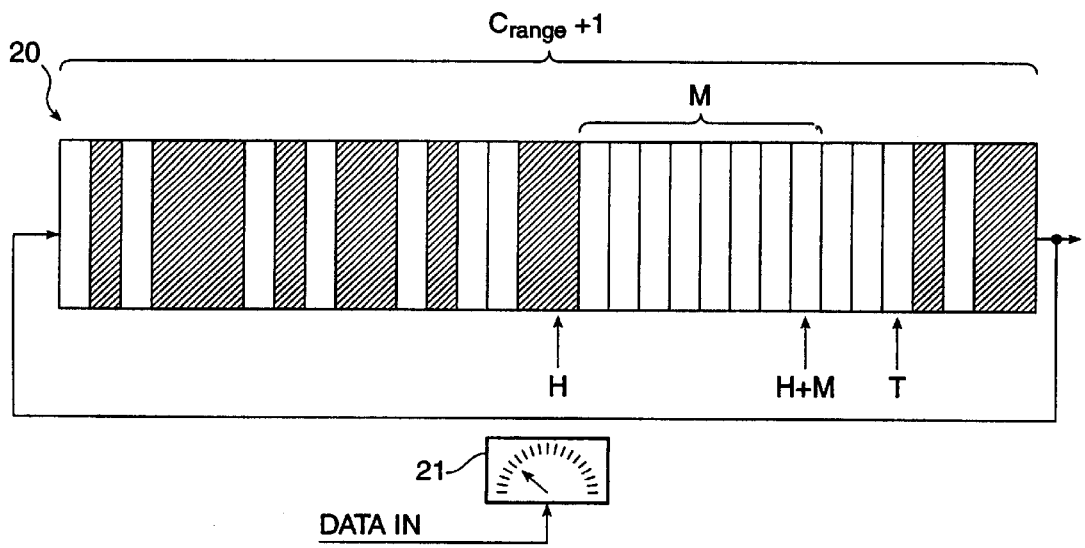
FIG. 2 is a block diagram of a recirculating buffer in a first state according to the invention.

FIG. 2 illustrates such a buffer 20 with an associated router 21. The location of the "head" H of the queue is shown, the head being that cell with the highest count in its prepend yet received. The tail T is the location in the queue 20 of the lowest count cell which has not yet been received. A margin space M is of great importance. M is the margin space ahead of the head. Because the buffer is circular, some mechanism is required for determining whether a newly arrived cell is "younger" or "older" than the head H. If the count value C of the prepend of the newly-arrived cell is ahead of head H and behind tail T, then the cell must be younger than H. In this case, the H value must be reset to ahead of the T value and behind the H value, then the cell must be older than the head H, in which case no change is made to the H value.

The determination is made difficult if the value H is not far behind the tail (see FIG. 3), and if the count C is slightly ahead of the tail value T. If the circular buffer is sized correctly, the H value can only approach the T value when the T value is the count of a cell that has been lost in transmission. To remain well clear of the H value, the T value will normally increase as cells arrive. When the H value is not far behind the T value, a newly arrived cell of count C that is slightly ahead of the T value might not be older than the H value. It may in fact be younger than the head, but be intruding into the buffer region resulting from the delayed tail. The margin space M, represented by the M value, is used in this instance to determine whether the current cell count C is older or younger than the head H. The value M is defined as being the range in which it is possible for a count C to surpass H. A test is applied cyclically to determine to which cell group a cell belongs. Should count value C fall between the values H and H+M, it is considered to be younger than the head, regardless of the value T of the tail.

Figure 3:
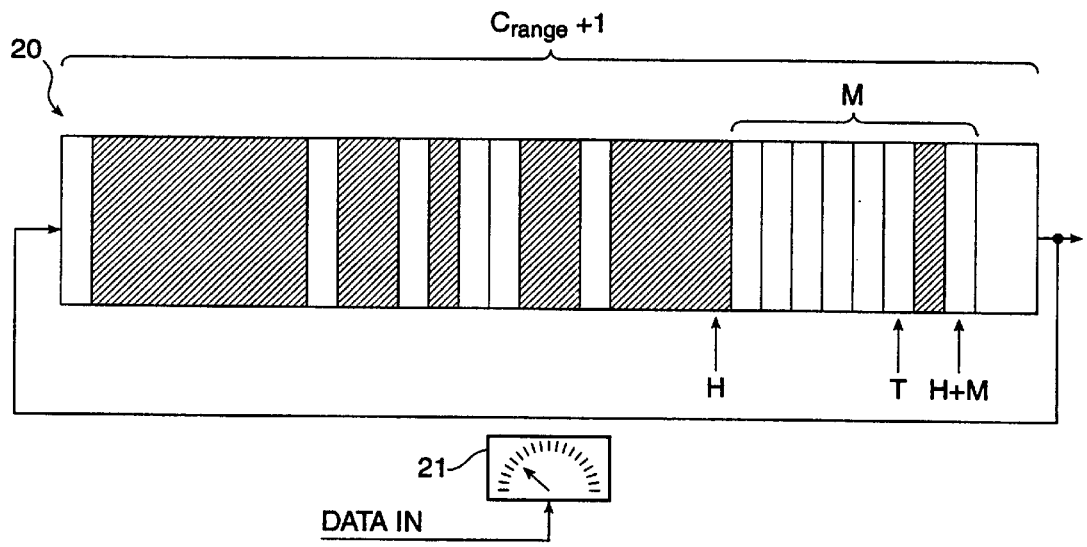
FIG. 3 is a block diagram of a recirculating buffer in a second state according to the invention.

The tail T must be advanced when the head H has come sufficiently close to it for the tail T to fall within the range values between H and H+M. FIG. 3 illustrates the case when the margin M has moved past T, thus overlapping the T position.

The following algorithm may be used to support IMA service according to the invention:

A. Whenever a cell arrives it is written into the circular queue dedicated to the cell stream to which it belongs. The exact queue location to which each cell is written is directly determined by its count (C) (the VPI/VCI value of the cell is not considered). The count prepend is discarded when the write operation takes place. Both H values and T values may be adjusted, based on the conditions:
 1. if $(C \leq H)$ then set $C_{comp}=C+C_{range}+1$, otherwise set $C_{comp}=C$
 2. if $(T \leq H)$ then set $T_{comp}=T+C_{range}+1$, otherwise set $T_{comp}=T$
 3. if $(C_{comp}<T_{comp})$ then set H=C
 4. if $(C_{comp} \geq T_{comp})$ and $(C_{comp} \leq H+M)$ then:
 5. set H=C
 6. set T=C+1
 7. if $(T>C_{range})$ then set T=0.

In reference to statements 1 and 2, since the count "rolls over" (the buffer is circular), both the C and T values must be adjusted to keep them "ahead" of H. This allows the comparisons required in the algorithm to be easily made.

B. During queue read opportunities the following is performed:
 1. if $(T \leq H)$ then set $T_{comp}=T+C_{range}+1$, otherwise set $T_{comp}=T$
 2. if (T=H) then
 3. output cell at location T (valid or otherwise) and then invalidate queue location without incrementing T
 4. else if (cell at location T is valid) OR $(T_{comp} \leq H+M)$ then:
 5. output the cell at location T (valid or otherwise) and then invalidate queue location
 6. set T=T+1
 7. if $(T>C_{range})$ then set T=0.

The minimum amount of buffer space required to store the queue of cells, Q, between H and T, according to the invention, is based on the need to accommodate the maximum number of cells that can arrive during the longest delay that can be expected to be experienced by a receiving cluster interface. It is possible to calculate this number exactly. In addition, margin size is set to be at least as large as the largest amount that the C value can exceed the H value. A worst-case estimate of this value may be obtained by determining how many cells can be in transit simultaneously over all but the fastest interface. The value of $C_{range}+1$, where $C_{range}=2^b-1$, where b an integer must be greater than or equal to the queue size Q plus Margin M. Some excess padding will result from quantization of these values if the buffering is stored in a memory with a size based on the power of 2, so allocation of the excess between Q and M is appropriate. It is preferable to pad in favor of M in order to minimize the delay associated with allowing T to be forced to move past a lost cell location and to minimize the chance that a newly arriving cell will overwrite the end of the queue after T has been forced to move past a lost cell location. Hence M' is set to $C_{range}+1-Q'$ where M' is a padded value for M.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. In a digital telecommunication system, a method for communicating asynchronously-transmitted cells of a session over a plurality of parallel links between a source node and a destination node in a preselected order, said method comprising:
 assigning to each said cell in said session a single count value indicative of order;
 transmitting over said parallel links said count value with its corresponding cell as a prepend;
 receiving said cells in any order;
 examining each prepend of each cell to determine order; and restoring each cell to its preselected order based on a value of its associated prepend, wherein the method further includes steps for determining whether a newly arrived cell is younger or older than a queue head location, the steps including:
  determining the newly arrived cell to be younger than the head if the count of the new newly arrived cell is equal to or ahead of the queue head location and behind or equal to a queue tail location; thereupon resetting the head value to be equal to the count of the newly arrived cell; and
  determining the newly arrived cell to be older than the head if the count of the newly arrived cell is ahead of the tail T and behind the head H, thereupon retaining the head value.

2. The method according to claim 1 further including:
using a margin of value M representing a largest amount that the count of a newly-arrived cell can exceed the queue head value H;
using the margin value M to determine whether a newly-arrived cell which is ahead of tail T and equal to or behind H+M is younger than the current H indicative of a lost cell; and if so,
resetting T to a value of C+1.

3. The method according to claim 1 further including setting queue size and margin size to accommodate a longest delayed cell transit time and a greatest amount that the count of a newly-arrived cell can exceed the value of the queue head.

4. In a digital telecommunication system, a method for communicating asynchronously-transmitted cells of a session over a plurality of parallel links between a source node and a destination node in a preselected order, said method comprising:
  assigning to each said cell in said session a single count value indicative of order;
  transmitting over said parallel links said count value with its corresponding cell as a prepend;
  receiving said cells in any order;
  examining each prepend of each cell to determine order; and
  restoring each cell to its preselected order based on a value of its associated prepend, wherein the method further includes the steps, upon a queue read operation, to accommodate a longest delayed cell transit time and a greatest amount that the count of a newly-arrived cell can exceed the value of the queue head, comprising:
    1. if (T*H) then setting $T_{comp}=T+C_{range}+1$, otherwise setting $T_{comp}=T$; thereafter
    2. if (T=H), then
    3. outputting cell at location T (valid or otherwise) and then invalidating queue location without incrementing T;
    4. else if (cell at location T is valid) OR ($T_{comp}*H+M$) then:
    5. outputting the cell at location T (valid or otherwise) and then invalidating queue location; thereafter
    6. setting T=T+1; then
    7. if ($T>C_{range}$) then set T=0, where H is the location of the head of a queue, T is the location of the tail of the queue and C is count range.

5. A digital telecommunications system, comprising:
a plurality of parallel links operable to communicate asynchronously-transmitted cells of a session;
a first cluster interface operable to perform the steps of:
  assigning each of the cells in the session a single count value indicative of a preselected order; and
  transmitting the count value over the parallel links as a prepend to the cells; and
a second cluster interface operable to perform the steps of:
  receiving the cells in any order;
  determining whether a newly arrived cell is younger or older than a queue head location (H), comprising:
    determining a newly arrived cell to be younger than the queue head location if the count value is equal to or ahead of a queue head location and behind or equal to a queue tail location (T); and
    determining the newly arrived cell to be older than the queue head location if the count value of the newly arrived cell is ahead of the queue tail location and behind the queue head location;
    if the newly arrived cell is younger than the queue head, resetting the queue head location to be equal to the count value of the newly arrived cell;
    examining the prepends of the cells to determine order; and
    restoring each cell to its preselected order based on the count value of its associated prepend.

6. The system of claim 5, wherein the system is further operable to perform the steps of:
using a margin of value M representing a largest amount that the count of a newly-arrived cell can exceed the queue head value H;
using the margin value M to determine whether a newly-arrived cell which is ahead of tail T and equal to or behind H+M is younger than the current H indicative of a lost cell; and if so,
resetting T to a value of C+1.

7. The system of claim 5, wherein the system is further operable to perform the step of setting queue size and margin size to accommodate a longest delayed cell transit time and a greatest amount that the count of a newly-arrived cell can exceed the value of the queue head.

8. The system of claim 5, wherein the system is further operable to perform the step of accommodating a longest delayed cell transit time and a greatest amount that the count of a newly-arrived cell can exceed the value of the queue head, comprising:
  1. if (T*H) then setting $T_{comp}=T+C_{range}+1$, otherwise setting $T_{comp}=T$; thereafter
  2. if (T=H), then
  3. outputting cell at location T (valid or otherwise) and then invalidating queue location without incrementing T;
  4. else if (cell at location T is valid) OR ($T_{comp}*H+M$) then:
  5. outputting the cell at location T (valid or otherwise) and then invalidating queue location; thereafter
  6. setting T=T+1; then
  7. if ($T>C_{range}$) then set T=0, where H is the location of the head of a queue, T is the location of the tail of the queue and C is count range.

9. A method for communicating asynchronous transfer mode cells over parallel links, comprising:
assigning each cell in a communication session over a plurality of parallel links a single count value indicative of a preselected order;
transmitting the count value over the parallel links as a prepend to the cells;
receiving the cells in any order;
determining whether a newly arrived cell is younger or older than a queue head location (H), comprising:

determining a newly arrived cell to be younger than the queue head location if the count value is equal to or ahead of a queue head location and behind or equal to a queue tail location (T); and determining the newly arrived cell to be older than the queue head location if the count value of the newly arrived cell is ahead of the queue tail location and behind the queue head location;

if the newly arrived cell is younger than the queue head, resetting the queue head location to be equal to the count value of the newly arrived cell;

examining the prepends of the cells to determine order; and restoring each cell to its preselected order based on the count value of its associated prepend.

10. The method of claim 10, further comprising:

using a margin of value M representing a largest amount that the count of a newly-arrived cell can exceed the queue head value H;

using the margin value M to determine whether a newly-arrived cell which is ahead of tail T and equal to or behind H+M is younger than the current H indicative of a lost cell; and if so, resetting T to a value of C+1.

11. The method of claim 10, further comprising setting queue size and margin size to accommodate a longest delayed cell transit time and a greatest amount that the count of a newly-arrived cell can exceed the value of the queue head.

12. The method of claim 9, further comprising accommodating a longest delayed cell transit time and a greatest amount that the count of a newly-arrived cell can exceed the value of the queue head, the step of accommodating comprising:

1. if (T*H) then setting $T_{comp}=T+C_{range}+1$, otherwise setting $T_{comp}=T$; thereafter
2. if (T=H), then
3. outputting cell at location T (valid or otherwise) and then invalidating queue location without incrementing T;
4. else if (cell at location T is valid) OR ($T_{comp}$*H+M) then:
5. outputting the cell at location T (valid or otherwise) and then invalidating queue location; thereafter
6. setting T=T+1; then
7. if (T>$C_{range}$) then set T=0, where H is the location of the head of a queue, T is the location of the tail of the queue and C is count range.

13. Logic embodied in a computer-readable medium, operable to perform the steps of:

assigning each cell in a communication session over a plurality of parallel links a single count value indicative of a preselected order;

transmitting the count value over the parallel links as a prepend to the cells;

receiving the cells in any order;

determining whether a newly arrived cell is younger or older than a queue head location (H), comprising:

determining a newly arrived cell to be younger than the queue head location if the count value is equal to or ahead of a queue head location and behind or equal to a queue tail location (T); and determining the newly arrived cell to be older than the queue head location if the count value of the newly arrived cell is ahead of the queue tail location and behind the queue head location;

if the newly arrived cell is younger than the queue head, resetting the queue head location to be equal to the count value of the newly arrived cell;

examining the prepends of the cells to determine order; and restoring each cell to its preselected order based on the count value of its associated prepend.

14. The logic of claim 13, wherein the logic is further operable to perform the steps of:

using a margin of value M representing a largest amount that the count of a newly-arrived cell can exceed the queue head value H;

using the margin value M to determine whether a newly-arrived cell which is ahead of tail T and equal to or behind H+M is younger than the current H indicative of a lost cell; and if so, resetting T to a value of C+1.

15. The logic of claim 13, wherein the logic is further operable to perform the step of setting queue size and margin size to accommodate a longest delayed cell transit time and a greatest amount that the count of a newly-arrived cell can exceed the value of the queue head.

16. The logic of claim 13, wherein the logic is further operable to perform the step of accommodating a longest delayed cell transit time and a greatest amount that the count of a newly-arrived cell can exceed the value of the queue head, comprising:

1. if (T*H) then setting $T_{comp}=T+C_{range}+1$, otherwise setting $T_{comp}=T$; thereafter
2. if (T=H), then
3. outputting cell at location T (valid or otherwise) and then invalidating queue location without incrementing T;
4. else if (cell at location T is valid) OR ($T_{comp}$*H+M) then:
5. outputting the cell at location T (valid or otherwise) and then invalidating queue location; thereafter
6. setting T=T+1; then
7. if (T>$C_{range}$) then set T=0, where H is the location of the head of a queue, T is the location of the tail of the queue and C is count range.

17. A system, comprising:

means for assigning each cell in a communication session over a plurality of parallel links a single count value indicative of a preselected order;

means for transmitting the count value over the parallel links as a prepend to the cells;

means for receiving the cells in any order;

means for determining whether a newly arrived cell is younger or older than a queue head location (H), comprising:

means for determining a newly arrived cell to be younger than the queue head location if the count value is equal to or ahead of a queue head location and behind or equal to a queue tail location (T); and means for determining the newly arrived cell to be older than the queue head location if the count value of the newly arrived cell is ahead of the queue tail location and behind the queue head location;

means for resetting the queue head location to be equal to the count value of the newly arrived cell if the newly arrived cell is younger than the queue head;

means for examining the prepends of the cells to determine order; and means for restoring each cell to its preselected order based on the count value of its associated prepend.

18. The system of claim 17, further comprising:

means for using a margin of value M representing a largest amount that the count of a newly-arrived cell can exceed the queue head value H;

means for using the margin value M to determine whether a newly-arrived cell which is ahead of tail T and equal to or behind H+M is younger than the current H indicative of a lost cell;

means for resetting T to a value of C+1 if the newly-arrived cell if a lost cell is indicated.

* * * * *

UNITED STATES PATENT AND TRADEMARK OFFICE
CERTIFICATE OF CORRECTION

PATENT NO. : 6,618,374 B1
DATED : September 9, 2003
INVENTOR(S) : Earl B. Manchester et al.

It is certified that error appears in the above-identified patent and that said Letters Patent is hereby corrected as shown below:

Column 7,
Line 16, after "claim" delete "10" and insert -- 9 --.
Line 26, after "claim" delete "10" and insert -- 9 --.

Signed and Sealed this

Twentieth Day of April, 2004

JON W. DUDAS
*Acting Director of the United States Patent and Trademark Office*